Patented July 3, 1945

2,379,662

UNITED STATES PATENT OFFICE 2,379,662

PROCESS FOR TREATING CRUDE PINE TAR

Wiley C. Smith, Arlington, Va., assignor to the United States of America, as represented by Claude R. Wickard, Secretary of Agriculture, and his successors in office No Drawing. Application October 4, 1944,
Serial No. 557,212

3 Claims. (Cl. 260—107)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a continuation in part of my copending application for patent, Serial No. 400,881, filed July 2, 1941, now Patent No. 2,364,104.

This invention relates to the treatment of crude pine tars to obtain more desirable products. It is particularly well adapted to the treatment of tars made by the kiln process.

An object of my invention is to remove from pine tar not only the dirt and other solid extraneous matter, but also both free and dissolved water.

Another object is to eliminate the losses which result from the usual distillation of tar.

Still another object is to provide a means of obtaining a purified tar having a desired viscosity and other properties.

Pine tars are obtained from the stumps and other resinous wood of the pine and certain other conifers by two general processes. In one process, the resinous wood is carbonized in metal retorts. Tar and lighter volatile oils which are driven from the wood by the destructive distillation are condensed by cooling and separated into rough fractions. The crude tar may be distilled to produce various grades of tars and tar oils. A distillation of tar usually results in an appreciable loss by cracking with the formation of water and uncondensed gases. Also the pitch which is formed by the distillation is of less value than are tars and tar oils. Tars made by this process are commonly referred to as retort tars.

In the other process, the resinous wood is carbonized by subdued combustion in kilns. Gases and light volatile oils escape into the air and are lost. The tar which is produced runs through channels in the floor of the kiln into an outside pit or receptacle. Tars produced by this process commonly are known as kiln tars. Tars made by a similar process in Sweden and other north European countries are known locally as "valley tars."

Kiln tar as it is first produced contains large quantities of pyroligneous acid and certain solid extraneous matter such as sand, clay, charcoal, etc. Before packaging, the tar is allowed to stand in order that the heavy solids may settle and the pyroligneous acid may separate from the tar and be withdrawn. However, this method is not effective on account of the viscosity of the tar and the small difference in density between the tar and the pyroligneous acid. Crude kiln tars which have settled for as long as 30 days may still contain solid extraneous matter and several percent of pyroligneous acid.

Pine tars are used in marine paints, in treating cordage, in compounding and reclaiming rubber, in disinfectants, and for a number of other purposes. The desired properties of a tar will vary according to the use for which it is intended. Tars may be classed in accordance with specific gravity and viscosity as thin, medium, and heavy; the thin tar having the lowest specific gravity and viscosity. Retort tars can be made to cover a wide range in viscosities by distillation and compounding.

The composition and properties of kiln tar will vary somewhat depending on the conditions of operation. The maker of kiln tar cannot control closely the properties of his products. The presence of dirt and excess moisture in kiln tar restricts its use. The Navy Department specifies that pine tar shall be a high grade retort tar, free from dirt and foreign matter, other than water, which shall not exceed 2 percent. The water is determined by distilling up to 200° C. Above 200° water is formed by the cracking of certain constituents of the tar. This tolerance of 2 percent is to cover dissolved water.

I have found that kiln tar at ordinary temperatures will dissolve about 1.6 percent of "water" or pyroligneous acid. The removal of dissolved water from pine tar will reduce its corrosiveness to metal and enhance its value as a paint constituent.

Crude pine tars consist of a mixture of unchanged constituents of the oleoresin derived from the wood, and pyrogenated products of both the oleoresin and the wood. The constituents of crude tars include natural terpene hydrocarbons, isomerized and polymerized hydrocarbons, resin acids, retene, wood phenols, pyroligneous acid, and various other substances, some of which have not been identified as yet. Crude retort tar usually contains considerable quantity of the lower boiling hydrocarbons, whereas crude kiln tars usually contain but very little of these lower boiling constituents.

The solubility of pine tar depends primarily upon the nature of the solvent used and the concentration of the resulting solution. As an example, the coal tar hydrocarbons, benzene, toluene, etc., will almost completely dissolve pine tars, except for the water and solid extraneous matter, while the lighter petroleum distillates fail to dissolve a substantial portion of the tar, especially at the lower concentrations.

I have found that spirits of turpentine has a selective solvent action for the constituents of tar which is different from that of the other common solvents and that the turpentine insoluble material (other than "water" and solid extraneous matter) has valuable properties. This turpentine insoluble material also has a higher specific gravity and a much greater viscosity than the original tars so that its removal will reduce the specific gravity and viscosity of the tar. A regulation of the removal of the quantity of this turpentine insoluble material will cause a variation in the specific gravity and viscosity of the tar. The addition of the lower boiling constituents to tar will cause a decrease in the specific gravity and viscosity of the tar. The diminution of the lower boiling constituents increases the specific gravity and viscosity of the tar.

The process of treating crude kiln tar according to my invention consists, in brief, of the removal of the free water, undissolved solid extraneous matter, and a desired portion of the heaviest and most viscous component of the tar, which is followed by the removal of the dissolved water.

The word "water" covers the aqueous portion of tar which contains acids, phenols, and other substances, and is generally referred to by the industry as pyroligneous acid. This aqueous liquid, or "water," is heavier than pure water, and may have a specific gravity as high as 1.09, although it usually has a specific gravity of around 1.05, whereas the specific gravity of crude kiln tar is around 1.08, while that of crude retort tar may vary considerably.

It has been pointed out above that the high viscosity of crude kiln tar and the small density difference between this tar and the extraneous matter prevent an effective gravity separation or removal of the undesirable constituents. The proper dilution of a tar with a suitable solvent will decrease its viscosity and change the density, so that the extraneous matter will separate by gravity from the diluted tar.

The general requirements of a suitable solvent are that it is substantially insoluble in water, that is, having a solubility in water of less than 1% by volume, that not more than a small portion should distill above 175° C.; and that it should have a specific gravity widely divergent from 1.05. Its desired solvent power will depend to some extent on the properties of the treated tar. As an example, if a heavy tar of the cordage treating type is required, the solvent used for thinning the crude tar to separate the "water," and solid extraneous matter, should precipitate a minimum of the heavy, viscous portion of the tar. For most purposes, however, a tar from which some of the turpentine insoluble portion has been removed is preferred.

A number of solvents may be used for the purposes of my invention, among which may be mentioned, by way of illustration, carbon tetrachloride, chloroform, coal tar hydrocarbons, petroleum distillates, and spirits of turpentine. While I prefer spirits of turpentine as a solvent, because it is similar to some natural constituents of pine tar, and it is not necessary to completely remove it from the diluted tar, in order to obtain a desirable refined tar, I may, for the purposes of my invention, employ other solvents, having a boiling range not exceeding 175° C., such as, for example, coal tar hydrocarbons, petroleum distillates, etc. Also, the heavy viscous portion of crude kiln tar, which is precipitated by the dilution with turpentine, has more desirable properties than that precipitated by petroleum distillates, and other solvents.

After the "water," solid extraneous matter and the insoluble portions have been separated from the diluted tar, the added solvent is removed by distillation. The dissolved water is distilled off along with the solvent. If a low viscosity tar is desired, the distillation is stopped as soon as the added solvent has been recovered. If turpentine is used as a solvent, the distillation may be stopped before all the added turpentine has been recovered, the higher boiling portion of the turpentine remaining in the tar tends to reduce its viscosity and specific gravity.

If a more viscous tar is desired, the distillation may be continued after the added solvent has been recovered until the temperature has reached as high as 200° C., thereby removing some of the lighter and lower boiling constituents of the tar, which may be collected separately. These lower boiling constituents, which were removed by the continued distillation, may be added to other tars to reduce further their viscosity and specific gravity. Turpentine and other higher boiling solvents, on removal from the diluted tar, by distillation, carry over a small quantity of phenols. These phenols may be removed by washing the solvent with aqueous sodium hydroxide. The recovered solvent may be repeatedly used without removal of the phenols.

The dilution and settling of the crude tar may be carried out in a manner similar to that which crude pine gum and analogous materials are diluted and settled.

The diluted tar after separation from the extraneous matter and insoluble portion may be distilled to recover the added solvent in a still such as is used to distill crude pine gum, or in any other suitable still. Steam may be injected during the first part of the distillation, but the injection of water, or steam, must be discontinued before distillation is completed, in order to remove the water from the tar.

The following example will serve to illustrate the operation of the process embraced by my invention:

One volume of spirits of turpentine (sp. gr. 0.86 at 25° C.) may be added, with stirring, to one volume of crude kiln tar (sp. gr. 1.08 at 25° C.). The mass may be stirred until maximum solution is effected and then allowed to stand overnight, or for at least two hours, or until such time as the diluted tar separates from the "water," trash, etc. The diluted tar may be placed in a still and heated to substantially 150° C. when steam may be injected, and distillation by steam carried on until the solvent recovered equals substantially 95% of the solvent added. The steam injection may be discontinued, and the temperature of the tar raised to 170° C. to drive out any residual water. This dilution will cause a separation of the free water and a greater part of the insoluble portion of the tar.

The tar resulting from the above process contained no free and/or dissolved water, was of uniform composition, and had a viscosity approaching a "thin" tar, while the original tar would be classed as "heavy." The use of a greater proportion of turpentine for dilution would have precipitated a greater quantity of viscous material from the crude tar and resulted in a less viscous refined tar. The dilution of the crude kiln tar with an equal volume of low boiling coal tar oils would cause a separation of but a small part of the viscous portion of tar and the refined tar would be classed as "heavy."

While it is not possible to specify the exact quantities of the various solvents to use for dilution, nor the maximum temperature to which the distillation for removal of added solvent should be carried, in general, dilution of the crude tar with an equal volume of solvent is deemed sufficient to effect separation of free water, and other extraneous matter. The dilution with larger portions up to two volumes of turpentine and/or petroleum spirits may be made to obtain separation of substantially a maximum portion of the viscous material. For the production of a heavy tar the diluted tar may be distilled until the temperature reaches substantially 200° C.

Having thus described my invention, I claim:

1. A process for treating crude kiln pine tar containing impurities in aqueous solution to produce a substantially water-free refined product, comprising diluting the tar with a solvent to form a solution with the tar having a specific gravity different from the aqueous solution, said solvent having a solubility in water of less than 1 percent by volume and a maximum boiling point of not exceeding about 175° C., then agitating the mass, separating the diluted tar from the aqueous solution, then heating the diluted tar to a temperature of about 100° to 170° C. to drive off the solvent and dissolved water, and recovering the residue.

2. A process for treating crude kiln pine tar in the production of a water-free refined product comprising diluting the tar with carbon tetrachloride and agitating the mass, then separating the diluted tar from the water and other insoluble materials present, then heating the diluted tar at a temperature of about 100° to 170° C. to drive off the carbon tetrachloride and dissolved water, and recovering the residue.

3. A process for treating crude kiln pine tar in the production of a water-free refined product comprising diluting the tar with chloroform and agitating the mass, then separating the diluted tar from the water and other insoluble materials present, then heating the diluted tar at a temperature of about 100° to 170° C. to drive off the chloroform and dissolved water, and recovering the residue.

WILEY C. SMITH.